United States Patent
Fouarge et al.

(10) Patent No.: US 7,744,823 B2
(45) Date of Patent: Jun. 29, 2010

(54) POLYMERIZATION REACTORS WITH A BY-PASS LINE

(75) Inventors: Louis Fouarge, Dilbeek (BE); Sandra Davidts, Battice (BE)

(73) Assignee: Total Petrochemicals Research Feluy, Feluy (BE)

( * ) Notice: Subject to any disclaimer, the term of this patent is extended or adjusted under 35 U.S.C. 154(b) by 760 days.

(21) Appl. No.: 11/631,374

(22) PCT Filed: Jun. 28, 2005

(86) PCT No.: PCT/EP2005/053025

§ 371 (c)(1),
(2), (4) Date: Dec. 29, 2006

(87) PCT Pub. No.: WO2006/003144

PCT Pub. Date: Jan. 12, 2006

(65) Prior Publication Data

US 2007/0255019 A1    Nov. 1, 2007

(30) Foreign Application Priority Data

Jul. 1, 2004    (EP) .................................. 04103110

(51) Int. Cl.
*B01J 19/18* (2006.01)
*C08F 2/00* (2006.01)
*C08F 210/00* (2006.01)
(52) U.S. Cl. .......................... 422/132; 526/64; 526/348
(58) Field of Classification Search ................. 422/132; 526/64, 348
See application file for complete search history.

(56) References Cited

FOREIGN PATENT DOCUMENTS

WO    WO 94/29018    * 12/1994
WO    WO 2004/026463    * 4/2004

* cited by examiner

*Primary Examiner*—William K Cheung
(74) *Attorney, Agent, or Firm*—Tenley R. Krueger

(57) ABSTRACT

The present invention discloses a slurry loop reactor having at least two loops (1, 2) and comprising a by-pass line (11) connecting two points (12, 13) of the same loop reactor by an alternate route having a different transit time than that of the main route, said by-pass line also collecting the growing polymer of a first loop reactor (1) and sending said growing polymer to an entry point (13) in a second reactor (2).

20 Claims, 2 Drawing Sheets

POLYMERIZATION REACTORS WITH A BY-PASS LINE

This invention is related to the field of olefin polymerisation in double loop reactors.

High density polyethylene (HDPE) was first produced by addition polymerization carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerization effluent is formed which is a slurry of particulate polymer solids suspended in a liquid medium, ordinarily the reaction diluent and unreacted monomer (see for Example U.S. Pat. No. 2,285,721). It is desirable to separate the polymer and the liquid medium comprising an inert diluent and unreacted monomers without exposing the liquid medium to contamination so that said liquid medium can be recycled to the polymerization zone with minimal or no purification. As described in U.S. Pat. No. 3,152,872, a slurry of polymer and the liquid medium is collected in one or more settling legs of the slurry loop reactor from which the slurry is periodically discharged to a flash chamber thus operating in a batch-wise manner. The mixture is flashed in order to remove the liquid medium from the polymer. It is afterwards necessary to recompress the vaporized polymerization diluent to condense it to a liquid form prior to recycling it as liquid diluent to the polymerisation zone after purification if necessary.

Settling legs are typically required to improve the polymer concentration in the slurry extracted from the reactor; they present however several problems as they impose a batch technique onto a continuous process.

EP-A-0,891,990 and U.S. Pat. No. 6,204,344 disclose two methods for decreasing the discontinuous behaviour of the reactor and thereby for increasing the solids concentration. One method consists in replacing the discontinuous operation of the settling legs by a continuous retrieval of enriched slurry. Another method consists in using a more aggressive circulation pump.

More recently, EP-A-1410843 has disclosed a slurry loop reactor comprising on one of the loops a by-pass line connecting two points of the same loop by an alternate route having a different transit time than that of the main route for improving the homogeneity of the circulating slurry.

The double loop systems are quite desirable as they offer the possibility to prepare highly tailored polyolefins by providing different polymerising conditions in each reactor. It is however often difficult to find suitable space to build these double loop reactors as in the current configuration they need to be close to one another in order to insure adequate transfer of growing polymer from one loop to the other. The velocity of the material circulating in the transfer line is of less than 1 m/s: these lines must therefore be very short in order to avoid sedimentation and clogging due to the polymerisation of residual monomers. There is thus a need to provide means either to connect two existing reactors that may be distant from one another or to build two new reactors that do not need to be close to one another if available space so requires.

It is an aim of the present invention to provide a means for connecting two or more loop reactors.

It is another aim of the present invention to connect distant reactors.

It is also an aim of the present invention to decrease the residence time of the material in the line connecting the reactors.

It is yet another aim of the present invention to improve the homogeneity of the flow in the loop reactors.

It is a further aim of the present invention to increase the concentration of olefin in the first reactor.

It is yet another aim of the present invention to increase the solids content.

LIST OF FIGURES

Figure 1:
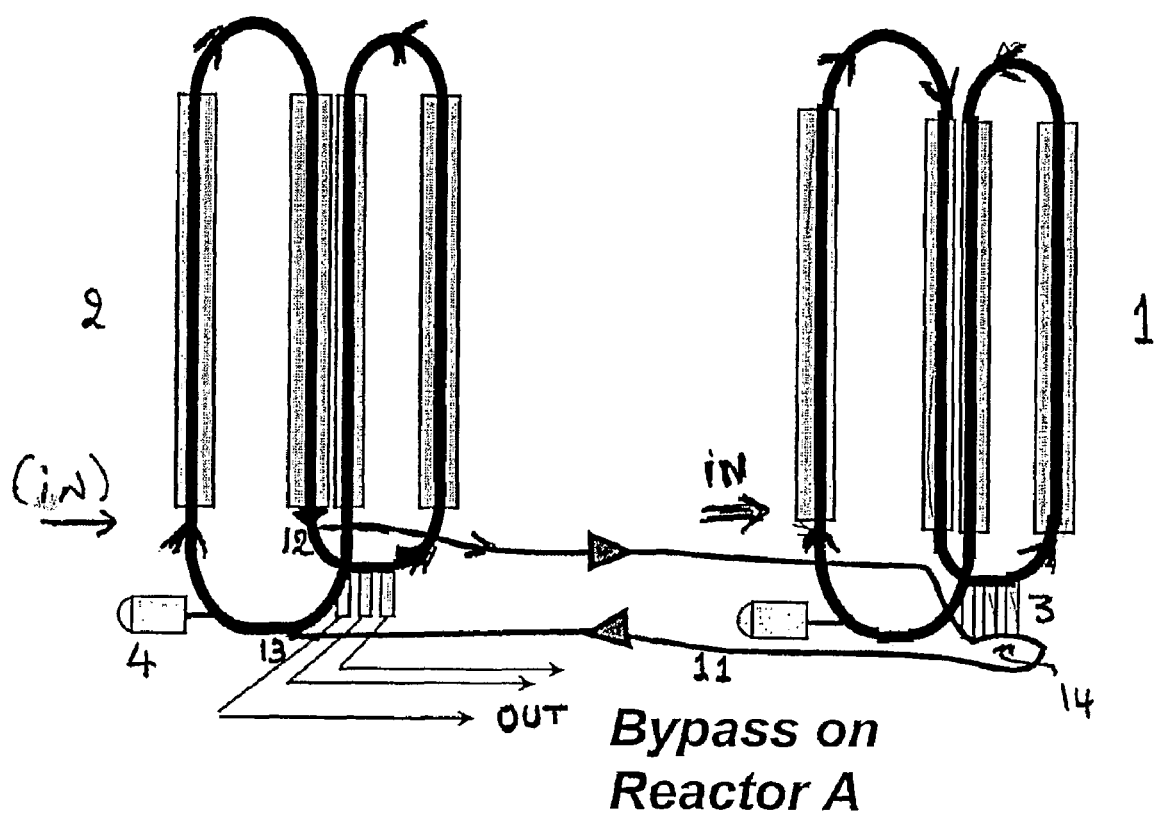
FIG. 1 represents the double loop reactor configuration of the present invention wherein the two reactors are connected by a by-pass line.

Accordingly, the present invention discloses a slurry loop reactor comprising at least two loop reactors connected in series and a by-pass line (11), as represented in FIG. 1, for connecting two points of the same loop reactor (12) and (13) by an alternate route having a different transit time than that of the main route, said by-pass line (11) also collecting the growing polymer exiting the first loop reactor (1) at exit points (14) and sending said growing polymer to an entry point (13) in the second reactor (2).

The growing polymer exiting the first reactor can be collected either by continuous discharge or by settling legs technology. Preferably, settling legs are used.

The entry point (13) into the second reactor is preferably located up-flow of the circulating pump, where the pressure is low.

Throughout the present description the loops forming the slurry loop reactor are connected in series and each loop can be folded.

Optionally, the by-pass may be jacketed.

The velocity of the material circulating in the by-pass must be sufficient to avoid sedimentation and possibly clogging: it must be of at least 3 m/s. One correlation frequently employed to calculate the minimum velocity in a horizontal pipeline is the Durand equation given by $$v_t = F[2g(s-1)D]^{1/2}$$

wherein $v_t$ is the minimum velocity, s is the ratio particle density/fluid density, D is the pipe diameter, F is an empirical constant that varies between 0.4 and 1.5 and g is the acceleration of gravity.

Preferably, the design of the by-pass line is such that the pressure difference between the two ends of the by-pass line (12) and (13) can provide the minimum velocity of about 3 m/s required to obtain adequate flow of material and to avoid blockage. If necessary, pumps may be added to increase velocity in the by-pass line. It is however preferred to rely only on the pressure difference as any added device leads to added difficulties. The velocity in the by-pass is preferably of at least 4 m/s, more preferably of at least 5.5 m/s and most preferably of at least 7 m/s.

Preferably the entry point (12) of the by-pass line is located higher than its exit point (13) in order to give the by-pass line a minimum slope of at least 7 degrees, preferably of about 9 degrees.

The by-pass line carries a fraction of the slurry of from 0.5 to 50% of the total flow rate, preferably of 1 to 25% and more preferably 1 to 15% of the total flow rate.

The flow time through the by-pass line is different from the time necessary to travel through the main loop as the routes have different lengths. This difference in travel time results in longitudinal mixing that improves the homogeneity of the slurry within the reactor.

The angles at flow separation and at flow reunion can be the same or different. The slurry is collected and re-injected in the main loop at an angle of from 1 to 90 degrees, preferably at an angle of from 30 to 60 degrees and more preferably at an angle of about 45 degrees.

The diameter of the by-pass is less than that of the main loop and the ratio DB/DL of the by-pass diameter DB to the loop diameter DL is of from 1:12 to 1:2, preferably of from 1:6 to 1:3. Typically the diameter of the by-pass line is of from 12 cm to 30 cm, preferably of 15.24 cm (6 inches) to 20.32 cm (8 inches). In addition the bends in the by-pass line are preferably long-radius bends: typically they have a radius of curvature that is equal to at least 10 times the diameter of the by-pass line.

The distance between the two loops to be connected can be of up to 30 m, preferably of up to 20 m, more preferably of up to 15 m, when operated solely by the pressure difference between the entry point and the exit point of the by-pass line.

The reactor can be operated with any catalyst system known in the art. It can be used for the homo- or co-polymerisation of olefins.

Preferably, the olefin is an alpha-olefin, more preferably ethylene or propylene, and most preferably ethylene.

The present invention produces the same advantages as those obtained with the by-pass line disclosed in EP-A-1410843:

- The polymer products obtained with the by-pass-modified loop reactor have a bulk density that is from 1 to 5% larger than that of the polymer products obtained with the unmodified loop reactor;
- The molecular weight distribution (MWD) is typically reduced by 5 to 15% in the polymer products obtained with the by-pass-modified loop reactor. The MWD is defined by the polydispersity index D that is the ratio Mw/Mn of the weight average molecular weight Mw to the number average molecular weight Mn.
- The catalyst productivity is substantially improved without any loss in production. The catalyst productivity is typically increased by 10 to 50%. This improvement in catalyst productivity is obtained thanks to an increase of the residence time in the reactor and to the extension of the stable operation window. It has been observed that the solids content, measured as the ratio of the particle mass flow rate to the total mass flow rate, is increased by at least 1.5%, preferably by at least 3%.

In addition to these advantages procured by the by-pass in a single reactor, typically in the second reactor, the concentration of olefin can be increased in the first reactor. Indeed, thanks to the by-pass line, the transfer lines connecting the first reactor exit point to the by-pass line can be shortened. The risk of polymerising unreacted olefin emerging from the first reactor in these transfer lines is thus decreased. The concentration of olefin in the first reactor can be increased to a concentration of at least 2%, preferably of at least 4%, more preferably of at least 6%.

EXAMPLES

Figure 2:
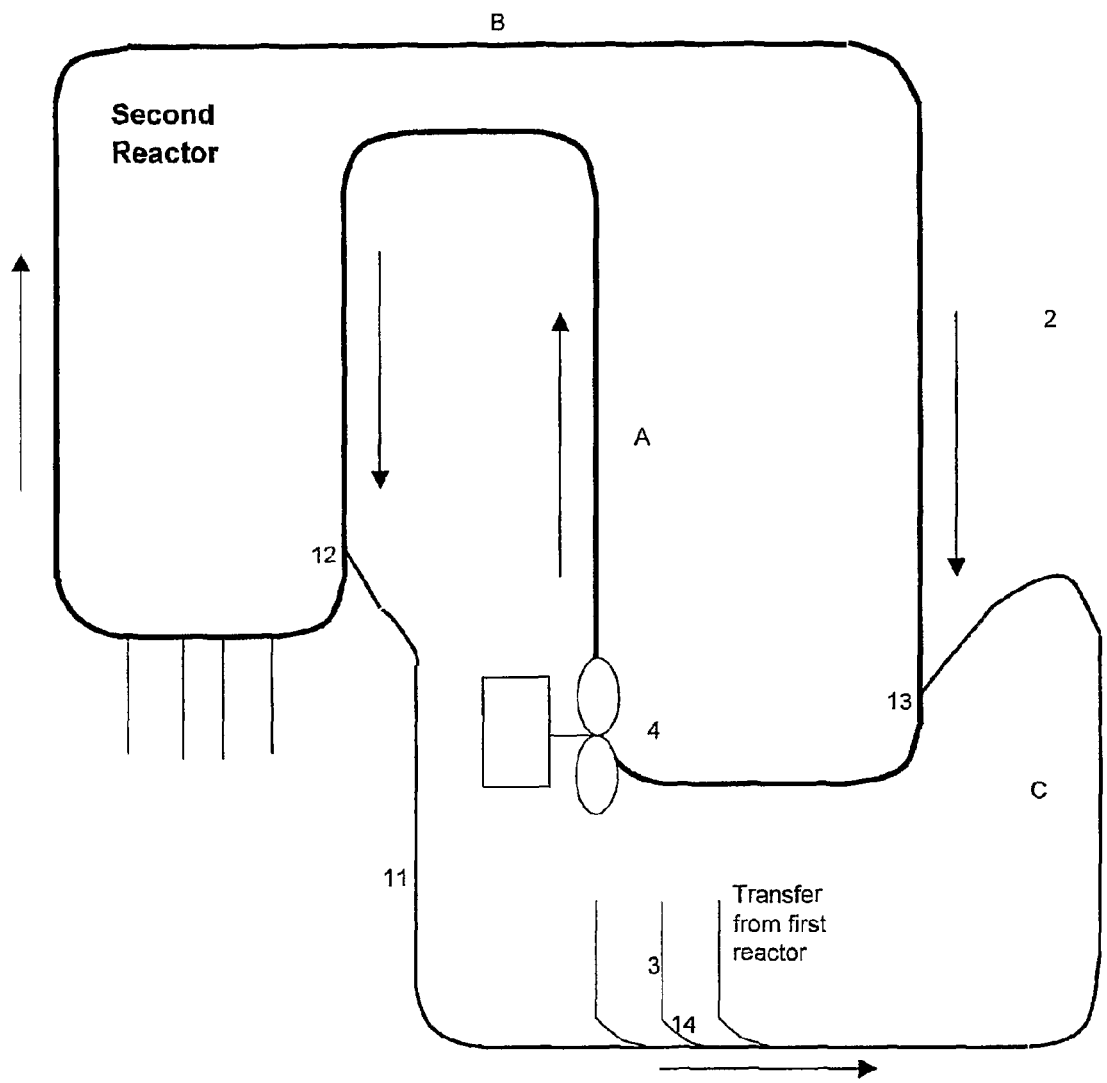
FIG. 2 represents the by-pass line connecting two points of the second reactor and collecting growing polymer from the settling legs of the first reactor.

Several by-pass designs were evaluated. A schematic design of the by-pass line is represented in FIG. 2. For all designs, the pressure drop between the entry point (12) and the exit point (13) of the by-pass line completely controlled the flow in the line.

In a first design D1, the parameters were selected as follows:
angle at flow separation (12)=33°
angle at flow reunion (13)=45°
length of by-pass line=10 m
diameter of by-pass line=15.24 cm (6 inches)
the by-pass line had 5 bends: 3 bends had an angle of 90° degrees, 1 bend had a deflection angle of 33 degrees and 1 bend had a deflection angle of 23 degrees.

Design D2, was the same as D1 except that the length of the by-pass line was equal to 15 m.

Design D3 was the same as D1 except that the diameter of the by-pass line was equal to 20.32 cm (8 inches).

Design D4 was the same as D2 except that the diameter of the by-pass line was equal to 20.32 cm (8 inches).

Design D5 was the same as D1 except that the angles of flow separation and of flow reunion were both set to 90°.

Design D6 was the same as D2 except that the angles of flow separation and of flow reunion were both set to 90°.

For all designs, the velocity at point A located between the flow reunion point (13) and the flow separation point (12) and representing 100% of the flow was selected to be about 9.3 m/s.

The calculation were carried out using a method fully described in "Memorandum of the pressure losses—Singular loss ratios of load and pressure losses by friction", by I. E. Idel'Cik.

The results are summarised in Table I. They disclose the velocity Vr in the reactor at point B between the flow separation point (12) and the flow reunion point (13) and representing the reduced flow, the velocity Vbp in the by-pass line at point C and the fraction of flow Fl, with respect to total flow, passing through the by-pass line.

TABLE I

|  | D1 | D2 | D3 | D4 | D5 | D6 |
| --- | --- | --- | --- | --- | --- | --- |
| Vr (m/s) | 8.6 | 8.6 | 7.9 | 8.0 | 8.8 | 8.8 |
| Vbp (m/s) | 7.1 | 7.3 | 8.1 | 7.5 | 5.6 | 5.1 |
| Fl (%) | 7.7 | 7.7 | 15.0 | 13.9 | 5.9 | 5.5 |

It can be seen that for all designs according to the present invention, the velocity in the by-pass line is well above the velocity of less than 1 m/s existing in currently available transfer lines and well above the minimum speed in horizontal lines of 3 m/s as calculated by Durand equation, necessary to avoid sedimentation.

Besides, it allows to drastically shorten the transfer lines between the exit point of the first reactor and the by-pass line, wherein unreacted monomer can polymerise and thereby block the line.

This factor in turn allows the increase of olefin concentration in the first reactor.

Example 1

Two loop reactors in series were first operated with conventional transfer lines between the 3 settling legs of the first reactor and the pump elbow of the second reactor.

The conditions were as follows:

First Reactor
volume: 19 $m^3$
number of settling leg: 3
diameter of settling legs: 20.32 cm (8")
volume of settling legs: 45 litres each
reactor diameter: 50.8 cm (20")
polyethylene production: 5 tons/hr
ethylene concentration: 6 wt %
solids concentration: 40%

Second Reactor
- Volume: 19 m³
- number of settling legs: 4
- diameter of settling legs: 20.32 cm (8")
- volume of settling legs: 45 litres each
- reactor diameter: 50.8 cm (20")
- polyethylene production: 3 tons/hr
- ethylene concentration: 7 wt %
- solids concentration: 40%.

Under these conditions, there was an average occurrence of two blockages per month in the settling legs.

Example 2

The same loop reactors were then connected by installing a by-pass line according to the invention under the settling legs of the first reactor.

The diameter of the by-pass line was 15.24 cm (6") and the length of the by-pass line was 18 meters. The settling legs were kept unchanged.

The reactors were then operated under exactly the same conditions as those of example 1.

No blockages occurred in the settling legs during the experiment.

The invention claimed is:

1. A double loop reactor system suitable for the polymerization of an olefin comprising:
   a) a first slurry loop reactor having an inlet for the introduction of an olefin monomer and a diluent liquid medium into said first loop reactor; and having a first pump in said first loop reactor for circulating liquid medium and olefin monomer through said first loop reactor to provide for the polymerization of said monomer to produce a slurry of polymer particles in said liquid medium;
   b) a second loop reactor connected in series with said first loop reactor and having a second a pump in said second loop reactor for circulating diluent liquid medium and olefin monomer through said second loop reactor to provide for the polymerization of said monomer to produce a slurry of polymer particles in said liquid medium;
   c) an outlet in said second loop reactor to said second loop reactor to recover polymer product from said second loop reactor;
   d) a bypass line extending from a bypass inlet point connected in said second loop reactor to a bypass outlet point connected to said second loop reactor at a location downstream of said inlet point to recycle polymer slurry from said second loop reactor through said bypass line and back to said second loop reactor; and
   e) an outlet from said first loop reactor connected to said bypass line at a location intermediate of said bypass inlet and outlet points.

2. The system of claim 1 wherein the inlet of said bypass line is connected to said second loop reactor at a location upstream of the second pump in said second loop reactor.

3. The system of claim 2 wherein the outlet of said bypass line is connected to said second loop reactor at a location upflow of the second pump in said second loop reactor.

4. The system of claim 1 wherein the outlet from said first loop reactor is connected to said bypass line through at least one settling leg.

5. The system of claim 4 wherein the outlet from said first loop reactor is connected to said bypass line through a plurality of settling legs.

6. The system of claim 1 wherein said second loop reactor has a vertical orientation and wherein the said bypass line is connected is connected to said second loop reactor at said inlet point at a location which is vertically higher than point of connection of said bypass outlet to said second loop reactor at said outlet point.

7. The system of claim 6 wherein said bypass line has an average slope from said bypass inlet point to said bypass outlet point of at least 7°.

8. The system of claim 7 wherein the average slope of said bypass line is about 9°.

9. The system of claim 1 wherein the average diameter (DB) of said bypass line is less than the average diameter (DL) of said second loop reactor.

10. The system of claim 9 wherein the ratio DB/DL of said bypass line diameter to said loop diameter is within the range of 1:12 to 1:2.

11. The system of claim 10 wherein said ratio DB/DL is within the range of 1:6 to 1:3.

12. The system of claim 9 wherein the average diameter of said bypass line is within the range of 20 cm to 30 cm.

13. The system of claim 12 wherein the average diameter of said bypass line is within the range of 6-8 inches.

14. The system of claim 1 wherein said bypass line is configured to comprise a plurality of long radius blends having a radius of curvature which is at least 10 times the average diameter of the bypass line.

15. A method for the polymerization of an olefin in a double loop reactor system comprising first and second interconnected loop reactors comprising:
   (a) introducing an olefin monomer into a first slurry loop reactor of said reactor system in a diluent liquid medium,
   (b) circulating said diluent liquid medium and said olefin monomer through said first loop reactor under conditions to polymerize said monomer to produce a slurry of polymer particles in said liquid medium,
   (c) supplying a polymer slurry from said first loop reactor to said second loop reactor and circulating said polymer slurry through a pump in said second loop reactor,
   (d) recovering a polymer product from a recovery outlet in said second loop reactor.
   (e) withdrawing a portion of the polymer slurry from said second loop reactor and passing said polymer slurry into a bypass line extending from a bypass inlet point connected to said second loop reactor to a bypass outlet point connected to said second loop reactor at a location downstream of said by pass inlet point in order to recycle a portion of the polymer slurry in said second loop reactor through said bypass line and back to said second loop reactor, and
   (f) introducing polymer slurry from said first loop reactor into said bypass line at a location intermediate of said bypass line inlet and outlet points.

16. The method of claim 15 wherein said polymer slurry is circulated through said bypass line at a velocity of at least 3 meters per second.

17. The method of claim 16 wherein the slurry velocity in said by pass line is at least 4 meters per second.

18. The method of claim 15 wherein the fraction of polymer slurry circulated through said bypass line is within the range of 1-25% of the total flow through said second loop reactor.

19. The method of claim 15 wherein the inlet of said bypass line is connected to said second loop reactor at a location upstream of the pump in said second loop reactor.

20. The method of claim 15 wherein said second loop reactor has a vertical orientation and wherein the said bypass line is connected is connected to said second loop reactor at a location which is vertically higher than point of connection of said bypass outlet to said second loop reactor.

* * * * *